Sept. 2, 1952     E. F. WRIGHT, JR     2,609,511

SENSITIVE PULSE AMPLIFIER COUNTER

Filed Oct. 25, 1949

INVENTOR

EDWARD F. WRIGHT, JR.

BY *[signature]*

ATTORNEY

Patented Sept. 2, 1952

2,609,511

UNITED STATES PATENT OFFICE 2,609,511

SENSITIVE PULSE AMPLIFIER COUNTER

Edward F. Wright, Jr., Kingston, Tenn.

Application October 25, 1949, Serial No. 123,371

3 Claims. (Cl. 250—83.6)

This invention relates to irradiation counters and more particularly to those used to indicate the strength of irradiation fields.

Counters of this type, usually known as Geiger-Mueller or G-M counters, have come to have wide use not only in research laboratories, but also in prospecting and exploring for irradiation substances in the earth, and in general servicing wherever radioactivity occurs. To facilitate such wide application, these devices must be readily portable and self-contained, of as light weight as possible, and of simple construction and easy operation so as to be available to unskilled users.

It is an object of my invention to produce a simple and highly efficient irradiation counter.

It is a further object to produce a device of the class described which shall be particularly economical in the use of battery voltage either as respects the supply of such voltage sources or to circuit design minimizing leakage effects, or both.

It is an important object of the invention to increase the overall sensitivity while at the same time utilizing only a minimum number of amplification units. This object is obtained by a circuit design whereby the counter pulse is given a high degree of amplification.

In accordance with my invention, the pulse emitted by the counter tube is impressed by direct coupling onto the grid of a three-electrode gaseous tube in whose anode-cathode circuit are connected a capacitor and the moving coil of an electrical-acoustical transducer of the type having a permanent magnet field, the output electrodes of said gaseous tube being strongly biassed by the effective voltage supply of which a portion under suitable switch control serves also to charge said capacitor through a high resistance, thereby effecting in the reproducer a high amplification of the impressed pulses.

The foregoing and other objects of the invention and the invention itself will be better understood from a consideration of the detailed description below given of various embodiments of the invention taken in connection with the accompanying drawings of which:

Figure 1:
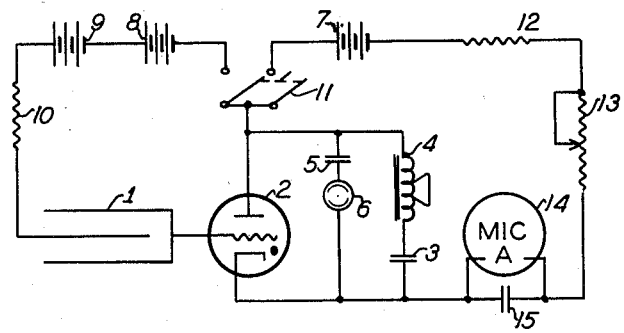
Figure 1 is a circuit diagram of one embodiment of the counter of my invention.

Referring to Figure 1, 1 indicates a conventional type of G-M counter having an inner rod electrode surrounded by a cylindrical electrode. 2 indicates a gas filled tube having anode, cathode and grid electrodes. The outputting electrode of the counter tube is directly connected to the grid of the gaseous tube. Connected across the output electrodes of the last mentioned tube is a capacitor 3 electrically connected in series with the actuating coil of an electrical-acoustical transducer of the type having a permanent field magnet. In parallel with said series connection, a further series related capacitor 5 and neon flasher indicator tube 6 are connected. Said gaseous tube may be of any suitable type and need have no heating filament since it is an important feature of my invention that the circuit design enables the desired tube operation by means of a cold cathode.

For supplying the necessary operating voltages for the said tubes and their circuits, there is provided what may be termed a multi-section voltage source whose sections are indicated consecutively as 7, 8 and 9. Incidentally, the component sections coincide with standard dry cell units that are available. This composite source at its one terminal is connected through a high resistance 10 to the inner electrode of tube 1. The two righthand sections of the source are interconnected by a double pole switch, and its pole connecting conductor is, in turn, connected to the anode of the gaseous tube. The other terminal of the composite battery at the right hand section 7 is connected through a high resistance 12, a potentiometer 13 and a parallel connection of the meter 14 and capacitor 15 to the cathode of the gaseous tube. In practice this meter is usually a micro-ammeter of suitable type, the shunting capacitor being chosen respecting other circuit constants so that an integrating operation on the recurring pulses is effected so as to enable a reasonably steady ammeter indication. Under these circumstances, the meter reading indicates the average frequency of occurrence of the pulses.

Figure 2:
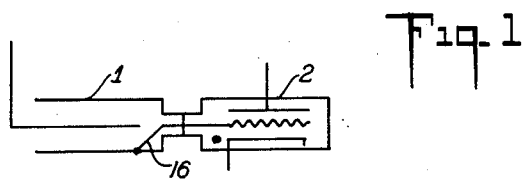
Figure 2 shows, mostly diagrammatically, a structural modification of the associated counter and gaseous tubes.

In Figure 2 the extended conductor between tubes 1 and 2 has been replaced by a common structure embodying both said tubes. In this figure, the reference numerals of Figure 1 have been used for similar parts. In this combined structure, it will be seen that the envelopes of the respective tubes are continuous. The representations of the two tubes in this figure are conventional. Here, the outer conductor of tube 1 is effectively connected to the grid of tube 2 through a conductor 16. This conductor, of course, in practice is insulated from the other electrodes of tube 2 and its entry into tube 2 is analogous to the usual lead-in. It is to be noted particularly that in case of both of the connections to the grid in Figures 1 and 2, there is no branch conductor and that the structure, especially that in Figure 2, is such as to minimize leakage.

Figure 3:
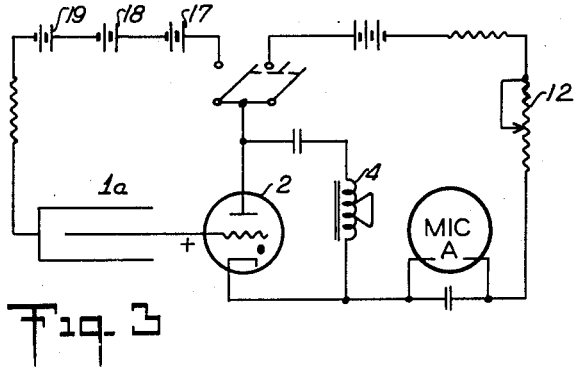
Figure 3 is a diagrammatic showing of a modification of Figure 1.

In Figure 3 is shown a modification of the circuit and of the battery connections to the input and of the output connections from the counter tube here indicated as 1a. In the arrangement according to this modification, the sections of the battery used to bias the counter tube have been arbitrarily increased to three indicated at 17, 18 and 19 and appear reversed respecting polarity of sections 7 and 8 in Figure 1. Similarly, a corresponding change has been made in the counter tube connection so that the inner electrode is the one directly connected to the grid of tube 2. In this modification, the principal bias path may be looked on as leading from the positive terminal of section 17 to the anode of tube 2, its grid and the inner conductor of tube 1; instead of by way of the right hand section of the battery, the high resistance 12, the ammeter and its shunt capacitor and a portion of the space path of tube 2 as shown in Figure 1. In Figure 3 the biasing arrangement is adapted to the illustrated reverse arrangement of counter tube electrodes wherein the inner one is connected to the grid of the gaseous tube. In this modification of Figure 3, the battery sections can be of the same voltage as those of Figure 1 with a preferred exception. For example, and not as a limitation, if the left hand sections are to be of 300 volts, the right hand section can be somewhat less, say, of the order of 280 volts. This modification accordingly shows another method by which the concept indicated in Figure 1 may be carried out. It will be obvious how the combined structures shown in Figure 2 can also be used in connection with the circuit arrangement of Figure 3.

Figure 4:
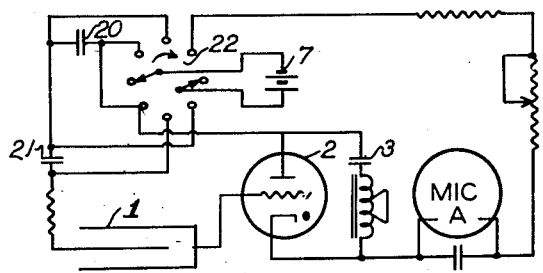
Figure 4 shows a further modification using only a single battery section.

Figure 4 illustrates the modification according to which the invention can be embodied with a notable reduction in the expense for voltage sources. By this arrangement a battery source corresponding to one of the sections 8 or 9 shown in Figure 1 constitutes the entirety of the original voltage source. Here, the other two sections 8 and 9 of the multi-section source are replaced by two capacitors 20 and 21 and a suitable switch 22 shown as a rotary double pole switch. This switch operates to connect the source 7 in its first step across capacitor 20 to charge it. In its next step, the switch connects source 7 to charge capacitor 21. In the next step, the switch connects source 7 across capacitor 3 by way of the same circuit 12, 13, 14 and 15 as shown in Figure 1. It will be noted also that in this position of switch 22, said source 7 and said capacitors 20 and 21 are in series relation respecting counter tube 1 in the same manner as the source sections 7, 8 and 9 in Figure 1. In this manner there has been shown how the additional sections 8 and 9 can be replaced by much less expensive elements such as capacitors 20 and 21. Under the conditions imposed in the operation of this embodiment, the charges of the two capacitors 20 and 21 can be relied on to last a relatively long period of time and when discharged can be readily re-charged by again operating switch 22.

In case of all the embodiments illustrated in the drawing, the said gaseous tube 2 is operated without a filament, that is, it functions as a cold cathode tube. It is possible, therefore, to further economize in the voltage source since the appreciable consumption of current in filamentary heating is entirely eliminated. This feature constitutes a valuable improvement in connection with portable instruments. From it also is realized a greater constancy and stability in operation.

In operation, according to the embodiments of Figures 1 and 2, a closure of switch 11 applies the biasing potential to counter tube 1 and also connects the multi-section voltage source from a point between sections 7 and 8 to the anode of tube 2. This also has the effect of charging capacitor 3. Now, upon the arrival of a pulse from counter tube 1 on the grid of tube 2, the latter is triggered and capacitor 3 discharges thereby producing an audible indication in the reproducer 4. After the discharge of tube 2, it does not immediately have enough voltage by reason of the high resistance of 13 to keep on firing. It is therefore extinguished and prepared for the next event from counter tube 1. For the purposes of this operation, it is noted that the charging time of capacitor 3 is relatively short, but its operation is not fast enough to keep tube 2 in continuous glow or discharge.

It is furthermore noted that the reactance relations between the coil of reproducer 4 and the capacitor 3 are such that there is produced during the discharge of the capacitor a greatly magnified reproduction of the input pulse from the counter tube 1. This same amplifying effect is also produced in case of the embodiments shown in Figures 3 and 4 even though, in these figures, the control circuits as will be seen are somewhat different; and the operation generally, in case of Figures 3 and 4, will be obvious from the foregoing description. A succession of pulses produces a reasonably steady indication on the meter.

A further elimination of possible leakage is believed to be realized also in the advantageous location of switch 11 between two voltage source sections. This conclusion is derivable from the fact that less leakage is noticed at the division between two portions of a battery source than occurs in a break of the conductor leading from a terminal of the accumulated voltage of said portions.

While it is obvious that the values of constants used in the embodiments of this invention can vary considerably in different circumstances, it may be stated merely as an illustrative case and without limitation that the following values of elements have been used satisfactorily.

| | | |
|---|---|---|
| Potentiometer resistance 13 | megohm | 1 |
| Resistance 12 | ohms | 100,000 |
| Resistance 10 | megohm | 1 |
| Capacitor 15 | microfarad | 1,000 |
| Capacitors 3, 5 | do | .01 |
| Right hand battery section, Figure 3 | volts | 280 |
| Other battery sections | do | 300 |

While in the description given above particular elements have been referred to, it is obvious to those skilled in the art that many changes in details and elements may be made without departing from the spirit of the invention, which is defined in the following claims.

What is claimed is:

1. A radioactivity detector and measuring device comprising a Geiger-Mueller tube having a cathode electrode and an anode electrode, a cold cathode glow tube having a cathode, an anode and a control electrode, electrical connection means between an electrode of the Geiger-Mueller tube and the glow tube control electrode, a network, including at least a first capacitor, electrically connected in shunt with the glow tube cathode-anode interelectrode space, a single potential source for energizing both the Geiger-Mueller tube and the glow tube and having a magnitude lower than the operating working voltage of either of said tubes, at least a second capacitor having one terminal thereof electrically coupled to the other electrode of the Geiger-Mueller tube, an integrating current indicator having one terminal connected to the glow tube cathode and switch means for selectively first connecting the said second capacitor in shunt with the potential source and then connecting the second capacitor, second terminal, the potential source and the indicator free terminal in series whereby the summation of the capacitor potential plus the battery potential is of greater magnitude than the operating working voltage of the Geiger-Mueller and glow tubes.

2. The device of claim 1 including a third capacitor having a first and a second terminal with the first terminal thereof connected to the second terminal of the second capacitor and to the switch means, and the second terminal connected to the switch means and the anode of the glow tube whereby operation of the switch places the second and third capacitors successively in shunt with said potential source and finally in series with each other, the potential source, the indicator, and the interelectrode space of the glow tube.

3. The device of claim 1 in which the network comprising the first capacitor includes the actuating coil of an electro-acoustical transducer, said transducer having a permanent magnetic field and said first capacitor being of a size selected to resonate at a selected frequency with the inductance of the transducer actuating coil.

EDWARD F. WRIGHT, Jr.

REFERENCES CITED

The following references are of record in the file of this patent:

UNITED STATES PATENTS

| Number | Name | Date |
|---|---|---|
| 2,122,222 | Vingerhoets | June 28, 1938 |
| 2,496,886 | Molloy et al. | Feb. 7, 1950 |
| 2,531,106 | Brown et al. | Nov. 21, 1950 |

OTHER REFERENCES

Gingrich, Review of Scientific Instruments, May, 1936, pp. 207–210.

Atomic Energy Commission Document MDDC, 1502, Aug. 1, 1946, 8 pp.

Atomic Energy Commission Document AECD, 2410, June 30, 1945, pp. 11–15.